3,241,988
ALUMINA REFRACTORIES AND PREPARATION
Gerhard Bayer, Hinteregg, Zurich, Switzerland, assignor to Owens-Illinois Glass Company, a corporation of Ohio
No Drawing. Filed May 16, 1961, Ser. No. 110,336
5 Claims. (Cl. 106—65)

This invention relates to alumina refractories and to methods for their preparation.

It is well-known that sintered alumina refractories are high grade refractories useful in furnaces and the like for withstanding high temperatures. It is desirable in most applications that they have a high density and hence a low porosity.

The very property of the alumina refractories which makes them of wide usefulness, namely, their high refractoriness, makes them difficult to prepare by sintering in a dense state of low porosity. Thus, in order to obtain dense alumina refractories by pressing and sintering powdered alumina, it is necessary to employ sintering temperatures of about 1700° C. and higher.

It is therefore an object of the present invention to provide new alumina refractory materials and to provide a method for making dense alumina refractory materials of low porosity without the necessity for resorting to the extremely high temperatures of the prior art.

In accordance with the present invention, I provide a new alumina refractory comprising the solid state reaction product of alumina and up to 10 weight percent of tantalum pentoxide, $Ta_2O_5$, or niobium pentoxide, $Nb_2O_5$, or a mixture of these oxides. Usually the solid state reaction product contains from about 99.5 to 90 parts of aluminum oxide and from about 0.5 to about 10 parts of the pentoxide, although any amount of the tantalum oxide or niobium oxide less than 20 weight percent can be used. Such high amounts, however, produce no distinct added advantage and the amount employed is usually in the range from 0.5 to 5 parts by weight.

In accordance with the process of the invention, powders of alumina and the pentoxide compound are mixed in the stated proportions and compacted in the conventional manner under pressure and are then fired at an elevated sintering temperature. It will be appreciated that the amount of sintering and the shrinkage or compacting of the alumina refractory of the invention is a time-temperature relationship and that the higher the temperature the less time required to sinter the refractory to a particular density or shrinkage. Thus, temperatures can be much higher than the usually preferred temperatures mentioned hereinafter and temperatures employed can be, for instance, 1700 or 1800° C. Such high temperatures are, of course, as high as the temperatures that can be used to make a good dense pure alumina sintered refractory, but the advantages of the invention are still obtained in that a much shorter time can be used when using the alumina containing a small amount of the tantalum or niobium pentoxide sintering promoter. Generally, the temperatures of sintering will be at least 1350° C. in order to obtain a practical time of sintering, although, of course, somewhat lower temperatures could be employed with extremely long times. The usually preferred temperatures of sintering, on balance, have been found to be in the range between about 1400 and 1550° C.

The compositions of the invention are, of course, useful as furnace refractories and the like, and find application where pure alumina refractories are presently used.

EXAMPLE 1

In this example five sintered refractories were prepared using the relative amounts of alumina and tantalum pentoxide indicated in Table I. The alumina employed was analytical grade alumina with a grain size below 60 microns and pure $Ta_2O_5$ was employed with a grain size below 20 microns. These were mixed in an agate mortar, adding a small amount of acetone for easier mixing. The acetone evaporated during the mixing operation. The mixtures were compacted to discs of about 20 mm. in diameter and about 5 mm. thick, using a pressure of 500 kg. per sq. cm. The discs were all fired at 1400° C. for 20 hours and the linear shrinkage noted, as shown in the table. The surface porosity, also shown in this table, is merely a rough determination or indication of the shrinkage and is not a precise determination. In this test a drop of distilled water (0.03 cc.) was placed from a height of 10 mm. on the surface of each of the samples, exactly in the center. The time in seconds until the drop was absorbed completely was determined. Its reciprocal value times 100 is the value designated as "surface porosity" in Table I.

Table I

[$Ta_2O_5$—$Al_2O_3$]

| Parts by Weight | | Linear Shrinkage (20 hours at 1,400° C.) | Surface Porosity |
|---|---|---|---|
| $Ta_2O_5$ | $Al_2O_3$ | | |
| | 100 | 3.5 | 33 |
| 1 | 99 | 11.0 | 4 |
| 5 | 95 | 11.0 | 10 |
| 10 | 90 | 10.5 | 7 |
| 20 | 80 | 10.5 | 12 |

The results of Table I show that the tantalum pentoxide has a very strong effect on the sintering of the alumina. All of the refractories in this example containing tantalum pentoxide were hard and dense compared to the pure alumina refractory. It will also be seen that little improvement is obtained in the densification of the refractory when using more than 10, or even when using more than 5, parts of tantalum pentoxide.

Another pure alumina disc was made in exactly the same way from the same alumina and this disc was fired at a temperature of 1560° C. for a somewhat shorter time and its shrinkage was only 3%. Another disc prepared in the same manner from pure alumina was fired at the much higher temperature of 1680° C. and its linear shrinkage was 6.5%. However, even at this temperature the shrinkage and thus densification was not much more than half of that provided by small amounts of tantalum fired at only 1400° C.

EXAMPLE 2

Three further compositions were prepared. In these compositions the alumina was from a different source and was also of a grain size below 60 microns but had a higher proportion below 5 microns. Therefore, the shrinkage values are not comparable to those in Example 1. The first example was again of pure alumina. Three discs were prepared and these were treated at 1200° C. for 20 hours, 1380° C. for 10 hours, and 1560° C. for 2 hours. The shrinkages were 1%, 2.5%, and 3%, respectively. In the next composition, 88 parts of the same alumina was carefully mixed with 12 parts of niobium pentoxide and three discs were again made and treated at the same temperatures and times as the pure alumina discs. Shrinkages were, going from the lower to the higher temperatures, 3.5%, 13%, and 13.5%. The third composition was 71.4 parts of alumina and 18.6 parts of tantalum pentoxide and three discs were again made and treated at the foregoing respect to temperatures and times. Going from the lower to the higher temperatures, the shrinkages were 0%, 7%, and 8.5%, respectively.

As will be evident to those skilled in the art, various modifications of this invention can be made or followed in the light of the foregoing disclosure and discussion without departing from the spirit and scope of the disclosure or from the scope of the claims.

1. A hard and dense sintered refractory consisting essentially of the solid state heat reaction product of about 99.5 to 80 parts of alumina and about 0.5 to 20 parts of $Nb_2O_5$.

2. A hard and dense sintered refractory consisting essentially of the solid state heat reaction product of about 99.5 to 90 parts of alumina and about 0.5 to 10 parts of $Nb_2O_5$.

3. A hard and dense sintered refractory consisting essentially of the solid state heat reaction product of about 99.5 to 95 parts of alumina and about 0.5 to 5 parts of $Nb_2O_5$.

4. A method of preparing a dense sintered alumina refractory consisting essentially of mixing intimately from about 99.5 to about 95 parts of finely-divided alumina and from about 0.5 to about 20 parts of $Nb_2O_5$, compacting said mixture, and sintering said mixture at an elevated sintering temperature in the range from about 1350° C to about 1550° C., said mixture consisting essentially of said alumina and said $Nb_2O_5$.

5. A method of preparing a dense sintered alumina refractory consisting essentially of mixing intimately from about 99.5 to about 80 parts of finely-divided alumina and from about 0.5 to about 5 parts of $Nb_2O_5$, compacting said mixture, and sintering said mixture at an elevated sintering temperature of at least 1350° C.

References Cited by the Examiner

UNITED STATES PATENTS

| | | | |
|---|---|---|---|
| 2,177,943 | 10/1939 | McDougal et al. | 106—65 |

FOREIGN PATENTS

| | | |
|---|---|---|
| 755,860 | 8/1956 | Great Britain. |
| 796,489 | 6/1958 | Great Britain. |

TOBIAS E. LEVOW, *Primary Examiner.*

JOSEPH REBOLD, *Examiner.*